(12) United States Patent
Stojkovic et al.

(10) Patent No.: US 9,884,654 B1
(45) Date of Patent: Feb. 6, 2018

(54) VEHICLE ROOF FRAME ARCHITECTURE

(71) Applicant: FORD GLOBAL TECHNOLOGIES, LLC, Dearborn, MI (US)

(72) Inventors: Dragan B. Stojkovic, Taylor, MI (US); Colleen Marie Hoffman, Canton, MI (US); Stephen Thomas Kozak, Northville, MI (US); Jon A. Wilcox, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/299,647

(22) Filed: Oct. 21, 2016

(51) Int. Cl.
*B62D 25/04* (2006.01)
*B62D 25/06* (2006.01)
*B60J 1/00* (2006.01)
*B60J 1/08* (2006.01)
*B60J 7/16* (2006.01)
*B60J 10/70* (2016.01)
*B62D 29/00* (2006.01)
*B60J 1/02* (2006.01)

(52) U.S. Cl.
CPC .............. *B62D 25/06* (2013.01); *B60J 1/006* (2013.01); *B60J 1/02* (2013.01); *B60J 1/085* (2013.01); *B60J 7/1628* (2013.01); *B60J 7/1642* (2013.01); *B60J 10/70* (2016.02); *B62D 25/04* (2013.01); *B62D 29/008* (2013.01)

(58) Field of Classification Search
CPC ............ B62D 25/06; B60R 2021/0018; B60R 2021/0074; B60R 2021/0083; B60R 2021/132; B60R 2021/137; B60R 21/13; B60J 1/085; B60J 7/11; B60J 7/106; B60J 7/16; B60J 7/1607; B60J 7/1614; B60J 7/1628; B60J 7/1635; B60J 7/1642; B60J 7/165; B60J 7/1657; B60J 7/194
USPC ........................................................ 280/756
See application file for complete search history.

(56) References Cited

U.S. PATENT DOCUMENTS

| | | | | | |
|---|---|---|---|---|---|
| 2,556,062 | A | * | 6/1951 | Buehrig | B60J 7/106 296/148 |
| 3,298,731 | A | * | 1/1967 | Sangimino | B60J 1/085 296/219 |
| RE28,876 | E | * | 6/1976 | Notestine | B60R 21/13 280/756 |
| 4,120,529 | A | * | 10/1978 | Chrysler | B60J 7/106 296/218 |
| 4,138,155 | A | * | 2/1979 | Chrysler | B60J 7/106 296/218 |
| 4,195,866 | A | * | 4/1980 | Tundo | B60J 7/0573 292/127 |
| 4,626,026 | A | * | 12/1986 | Hasegawa | B60J 7/11 16/364 |
| 4,660,345 | A | * | 4/1987 | Browning | B62D 21/08 164/63 |

(Continued)

*Primary Examiner* — Gregory A Blankenship
(74) *Attorney, Agent, or Firm* — Jason Rogers; Brooks Kushman P.C.

(57) ABSTRACT

A roof structure includes a roof support longitudinally extending over a compartment area at a lateral centerline of a vehicle. A plurality of pillars support the roof support and include a transverse leg extending laterally outward from the roof support to a curved section, and a vertical leg extending downward from the curved section to a vehicle beltline. Windows are assembled to a openings that are defined by two pillars, the roof support and the vehicle beltline.

16 Claims, 12 Drawing Sheets

(56) References Cited

U.S. PATENT DOCUMENTS

| | | | | |
|---|---|---|---|---|
| RE32,496 E * | 9/1987 | Chrysler | | B60J 7/106 296/218 |
| 4,729,597 A * | 3/1988 | Fujihara | | B60J 7/106 16/272 |
| 4,821,394 A * | 4/1989 | Martinez-Vera | | B60J 7/106 29/401.1 |
| 5,725,273 A * | 3/1998 | Vernon | | B60J 7/201 224/315 |
| 6,039,391 A * | 3/2000 | Takahashi | | B60J 7/11 296/218 |
| 6,189,960 B1 * | 2/2001 | Mumura | | B60J 7/0015 160/7 |
| 6,299,244 B1 * | 10/2001 | Tarahomi | | B62D 23/005 296/191 |
| 6,321,495 B1 * | 11/2001 | Oami | | B60J 1/10 296/191 |
| 6,557,930 B1 * | 5/2003 | Bruggemann | | B62D 21/00 280/784 |
| 6,713,707 B2 * | 3/2004 | Gabbianelli | | B23K 11/002 219/230 |
| 6,890,014 B1 * | 5/2005 | King | | B60P 3/423 296/26.09 |
| 7,086,693 B1 * | 8/2006 | Huisman | | B62D 25/06 296/146.1 |
| 7,213,854 B2 * | 5/2007 | Dowdey | | B60J 7/11 296/218 |
| 7,506,911 B2 * | 3/2009 | Lee | | B62D 25/04 296/193.06 |
| 8,408,623 B1 * | 4/2013 | McAuliff | | B60J 7/11 296/210 |
| 8,944,496 B2 * | 2/2015 | Hida | | B62D 25/06 296/210 |
| 8,991,896 B1 * | 3/2015 | Whitehead | | B60J 7/106 296/121 |
| 9,027,989 B1 | 5/2015 | Joyce et al. | | |
| 2003/0198509 A1 * | 10/2003 | Barth | | B60R 21/13 403/180 |
| 2004/0108701 A1 * | 6/2004 | Kleinhoffer | | B60R 21/13 280/756 |
| 2005/0093321 A1 * | 5/2005 | MacWilliam | | B60R 9/00 296/24.34 |
| 2005/0104418 A1 * | 5/2005 | Zirbs | | B62D 65/06 296/210 |
| 2005/0134096 A1 * | 6/2005 | Fallis, III | | B60J 7/0053 296/218 |
| 2005/0258626 A1 * | 11/2005 | Hill | | B60R 21/055 280/756 |
| 2006/0082107 A1 * | 4/2006 | Bakhsh | | B60R 21/232 280/730.2 |
| 2007/0194604 A1 * | 8/2007 | Nygaard | | B60R 21/13 296/187.09 |
| 2007/0228777 A1 * | 10/2007 | Mollick | | B62D 25/06 296/210 |
| 2008/0185876 A1 * | 8/2008 | Vogt | | B62D 25/06 296/210 |
| 2009/0206635 A1 * | 8/2009 | Nydam | | B62D 25/06 296/210 |
| 2010/0259071 A1 * | 10/2010 | Enns | | B62D 23/005 296/203.01 |
| 2013/0319785 A1 * | 12/2013 | Spindler | | B62D 23/005 180/292 |
| 2014/0117653 A1 * | 5/2014 | Deschambault | | B60J 7/104 280/756 |
| 2015/0115662 A1 * | 4/2015 | Joyce | | B62D 25/06 296/193.12 |
| 2015/0224860 A1 * | 8/2015 | Bowles | | B60R 21/13 296/218 |
| 2016/0159404 A1 | 6/2016 | Lee et al. | | |
| 2016/0223544 A1 * | 8/2016 | Wang | | G01N 33/573 |
| 2016/0251038 A1 * | 9/2016 | Kawata | | B62D 25/087 296/190.08 |
| 2016/0304129 A1 * | 10/2016 | Hamdoon | | B62D 21/157 |

* cited by examiner

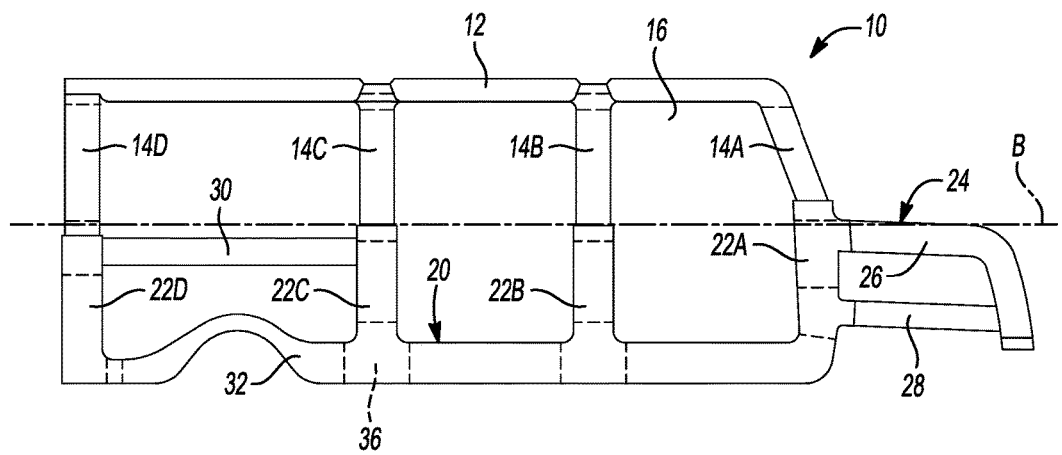
_Fig-1_
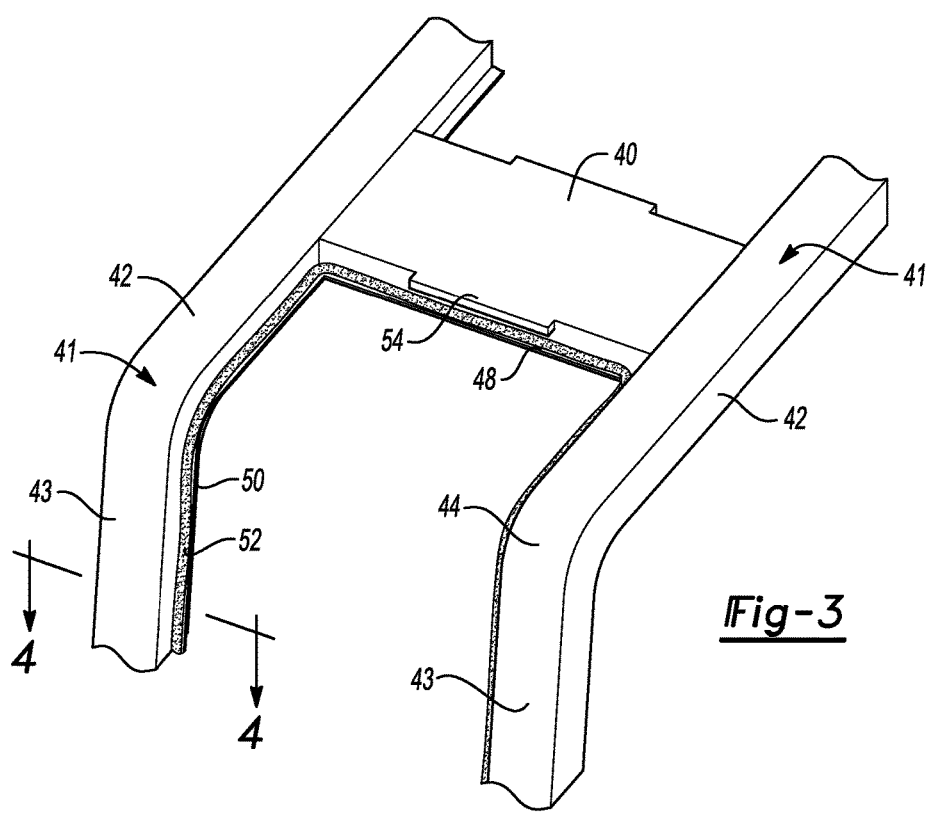
_Fig-3_

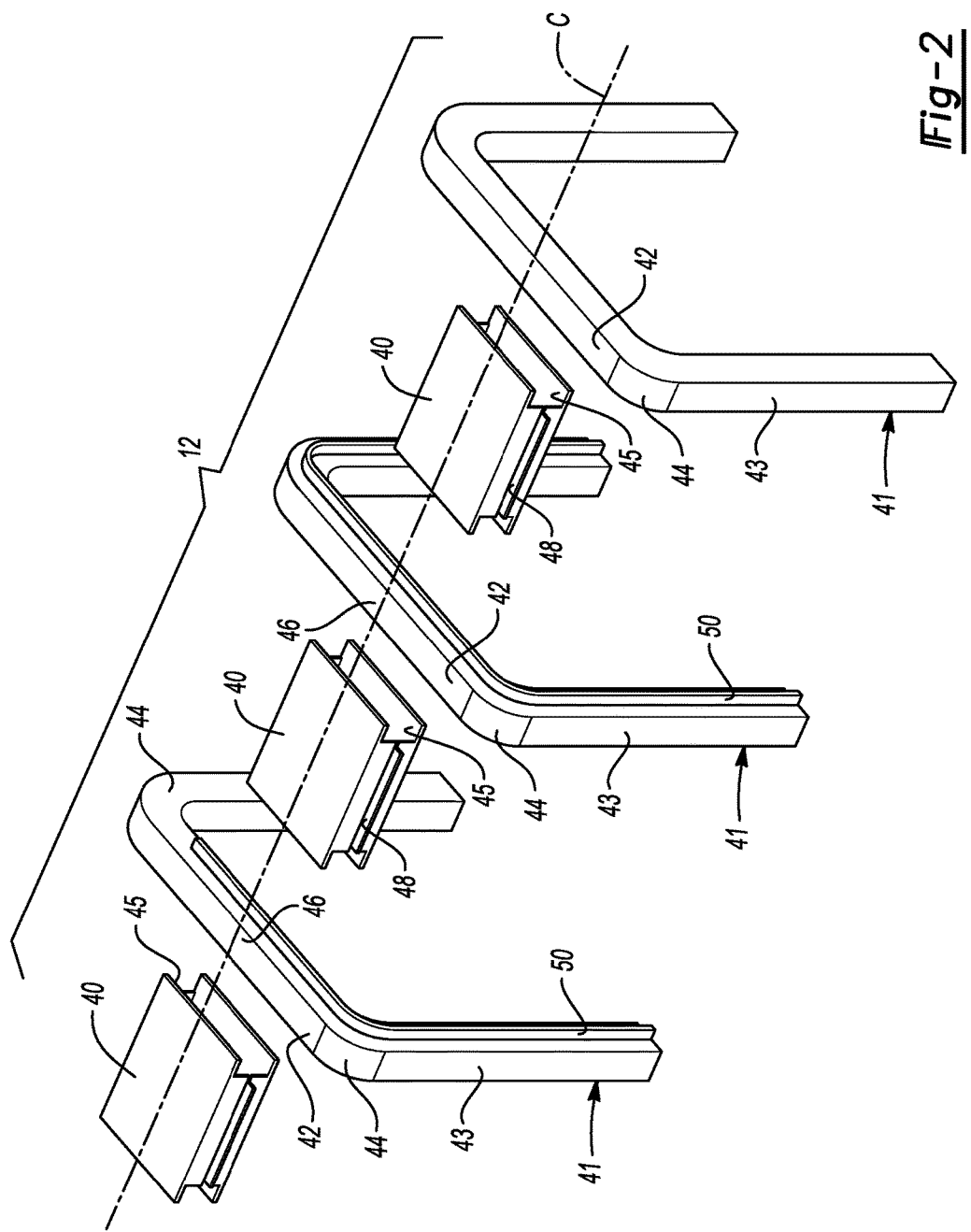

VEHICLE ROOF FRAME ARCHITECTURE

TECHNICAL FIELD

This disclosure relates to vehicle roofs, pillars and window structures.

BACKGROUND

Vehicle roofs are normally supported by A, B, C and, on some vehicles, D pillars that define door and window openings between the pillars and below the roof. Static or movable windows may be provided in the window openings. The tops of the pillars are joined to a roof rail located at the side edge of the roof. The windows are generally raised and lowered in tracks by a manual or power window regulator.

Convertible tops are available that are extended and retracted on a plurality of movable bows by side rails. The windows are generally raised and lowered by a manual or power window regulator.

Other types of roof structures have also been produced include removable hardtops that may include fixed windows or windows that are similar to those provided with convertible tops. In addition, roofs having removable fabric panels with plastic windows are provided for utility vehicles.

The above types of roof structures are effective but each have limitations and are not a flexible design. Some structures are expensive to manufacture, some do not offer an open-air option, some offer less roof crush resistance, and some are difficult to install or remove.

This disclosure is directed to solving the above problems and other problems as summarized below.

SUMMARY

According to one aspect of this disclosure, a roof structure is disclosed that includes a roof support longitudinally extending over a compartment area at a lateral centerline of a vehicle. A plurality of pillars support the roof support and include a transverse leg extending laterally outward from the roof support to a curved section, and a vertical leg extending downward from the curved section to a vehicle beltline. A plurality of windows is assembled to a plurality of openings that are defined by two pillars, the roof support and the vehicle beltline.

The roof structure may further comprise a first lip provided on a roof portion of the windows and a second lip provided on the roof support that is engaged by the first lip in an installed position and is disengaged by the first lip by pivoting the window upwardly about the roof portion. A latch may be provided at a spaced location from the second lip that retains the window in the installed position.

According to another aspect of this disclosure, a vehicle is disclosed that features a body defining a compartment having a beltline and a plurality of inverted U-shaped pillars connected at the beltline to opposite lateral sides of the compartment and extending over the compartment. A plurality of plates is connected to adjacent pillars at a central location. A plurality of windows is provided that have a side portion and a roof portion that are connected by a curved portion. Each window is assembled to one plate and between two adjacent pillars.

According to other aspects of this disclosure, the U-shaped pillars may be aluminum extrusions. The U-shaped pillars may be continuous one-piece extrusions.

Alternatively, the U-shaped pillars may further comprise two side extrusions and a roof extrusion that are connected by a curved corner casting.

The U-shaped pillars may further comprise a plurality of side flanges extending in a fore-and-aft direction from the U-shaped pillars and a top flange extending laterally from the plates. The windows may be supported by the side flanges of adjacent U-shaped pillars and the top flange. A central portion of the side flanges may be received by the centrally located plates to connect the U-shaped pillars to the plates. A seal is attached between the windows, the side flanges and the top flanges.

According to another aspect of this disclosure, the forward most U-shaped pillar may be adapted to support a windshield on a support flange. The windshield may be assembled to a windshield seal and the support flange of the forward most U-shaped pillar.

The window may be adapted to be a removable window by providing a first lip on the roof portion of the windows and a second lip on the plates that is engaged by the first lip in an installed position and is disengaged by the first lip by pivoting the window upwardly. A latch may be provided at a spaced location on the window or window frame that retains the window in the installed position.

The side portions of the windows and the roof portions of the window may be separate transparent panels and the curved portions of the windows may be aluminum extrusions that define a pocket for receiving a side curtain air bag.

According to another aspect of this disclosure, a vehicle is disclosed that comprises a body defining a compartment having a beltline, a longitudinal roof support defining a plurality of spaced receptacles. A plurality of inverted L-shaped pillars is connected at the beltline to a lateral side of the compartment to extend over the compartment to be received by the receptacles. A plurality of windows each has a side portion and a roof portion and each window is assembled to two adjacent pillars and the roof support, respectively.

According to other aspects of this disclosure, the L-shaped pillars may be stamped steel clamshell assemblies. The longitudinal roof support may also be a stamped steel clamshell assembly.

The L-shaped pillars may include a side flange extending in a fore-and-aft direction from the L-shaped pillars. A top flange may be included that extends laterally from the roof support to receive the windows on two side flanges of adjacent L-shaped pillars and the top flange.

The vehicle includes a windshield that is supported on a support flange provided on a forward most one of the L-shaped pillars. A windshield seal is assembled between the windshield and the support flange.

The window may be removable by providing a first lip provided on the roof portion of the windows and a cooperating second lip on the roof support that is engaged by the first lip in an installed position. The window may be pivoted upwardly to disengage the first lip from the second lip. A latch may be provided at a spaced location from the first lip to retain the window in the installed position.

The curved portions of the windows may define a pocket for receiving a side curtain air bag. The side portions of the windows and the roof portions of the window may be separate transparent panels.

The above aspects of this disclosure and other aspects will be described below with reference to the attached drawings.

BRIEF DESCRIPTION OF THE DRAWINGS

FIG. 1 is a side elevation view of a vehicle body structure including a roof support made according to one embodiment of this disclosure.

FIG. 2 is an exploded perspective view of a roof support including inverted U-shaped bows.

FIG. 3 is a fragmentary, perspective view of two roof support bows connected by a roof support plate.

DETAILED DESCRIPTION

Figure 4:
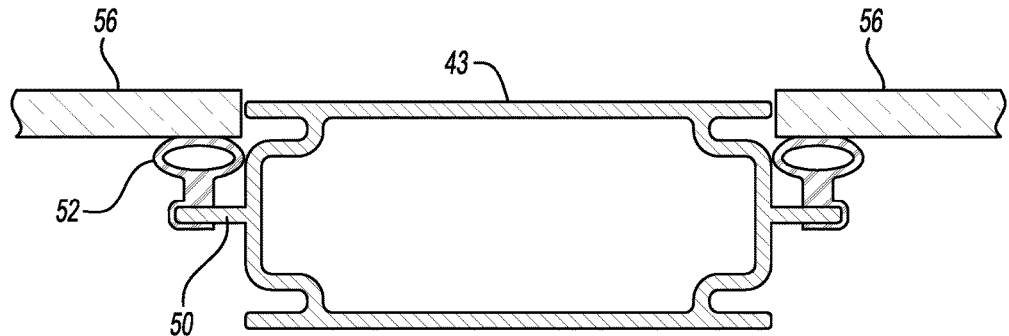
FIG. 4 is a cross-sectional view taken along the line 4-4 in FIG. 3 with partial illustrations of adjacent glass panels in cross-section.

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Referring to FIG. 1, a vehicle body structure 10 is illustrated that includes a roof support 12 that extends in the longitudinal vehicle direction. The roof support 12 is supported by a plurality of pillars 14 that are identified as A-pillar 14A, B-pillar 14B, C-pillar 14C and D-pillar 14D. The roof support 12 and pillars 14A-14D form the vehicle body structure above the compartment area or passenger compartment 16 of the vehicle. A lower body assembly 20 is also illustrated in FIG. 1 that includes lower pillars 22 and are designated A-pillar 22A, B-pillar 22B, C-pillar 22C and D-pillar 22D. The vehicle front end 24 is also illustrated and includes an upper fender support 26 and a lower fender support 28. A rear fender support 30 is illustrated as extending between the C-pillar 14C and D-pillar 14D and is disposed at or near the belt line B of the vehicle. The belt line B of the vehicle is at the lower edge of the windows of the passenger compartment. The lower body assembly 20 is assembled by joining tubular beams 32 at cast nodes 36. The upper ends of the lower pillars 22 are adapted to receive the lower ends of the pillars 14A-D.

Referring to FIGS. 2-9, an embodiment of this disclosure is illustrated that includes a segmented roof support in conjunction with inverted U-shaped bows. Referring specifically to FIG. 2, a plurality of roof support plates 40 are shown disposed between adjacent inverted U-shaped bows 41. The inverted U-shaped bows 41 include a transverse leg 42 that extends across the roof of the compartment area 16 (shown in FIG. 1) and a vertical leg 43 that extends from the beltline B (shown in FIG. 1) to a curved section 44 that joins the transverse leg 42 to the vertical leg 43 of the inverted U-shaped bows 41. The roof support plates 40 include a pair of flanges 45 that are adapted to receive a central portion 46 of the transverse leg 42.

A top window support flange 48 is provided on the roof support plates 40 and side window support flanges 50 are provided on the transverse leg 42 and vertical legs 43. The window support flanges 48 and 50 are adapted to receive a seal 52 as will be described with reference to FIG. 3 below. The roof support plates 40 are aligned along the center line C of the roof support.

Referring to FIG. 3, a pair of adjacent inverted U-shaped bows 41 are generally indicated by reference numeral 41. The adjacent inverted U-shaped bows 41 are connected by roof support plate 40. A top window support flange 48 is provided on the roof support plate 40 and a side window support flange 50 is provided on the adjacent inverted U-shaped bows 41. A seal 52 is attached to the window support flanges 48 and 50.

An interlock flange 54 is also provided on the roof support plates 40 above the top support flange 48. The interlock flange 54 is used to secure a window or other panel as will be described in more detail below with reference to FIGS. 6 and 9.

Referring to FIG. 4, a section is taken through one of the inverted U-shaped bows and is shown with a pair of windows 56 on opposite sides of the vertical leg 43 of the bow 41. The seals 52 are shown attached to the side window support flanges 50. The seal 52 is disposed between the bows 41 and windows 56 to prevent seepage of air or water.

Figure 5:
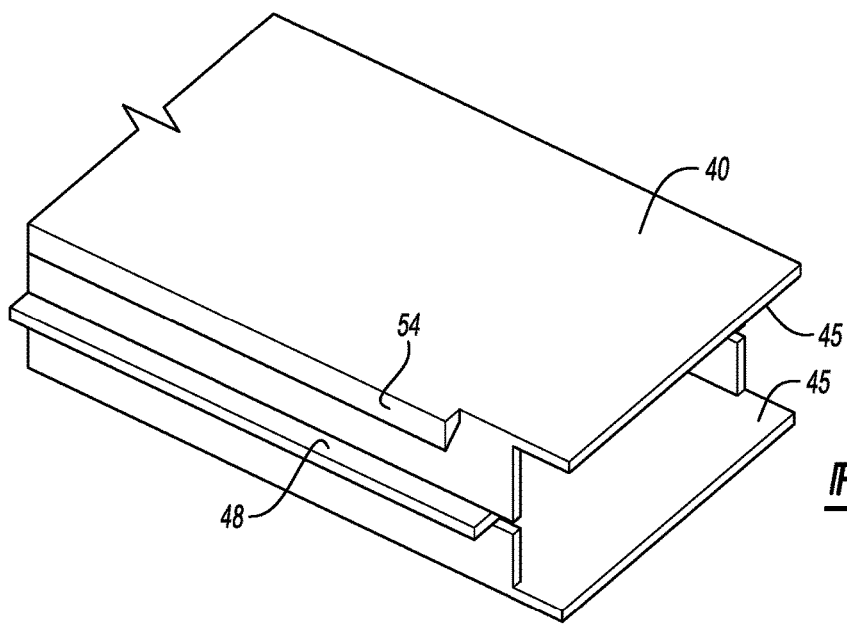
FIG. 5 is a fragmentary, perspective view of a roof support plate.

Referring to FIG. 5, a roof support plate 40 is shown that includes the pair of flanges 45 on a transversely extending side and the top window support flange 48 and interlock flange 54 on a longitudinally extending side of the roof support plate 40.

Figure 6:
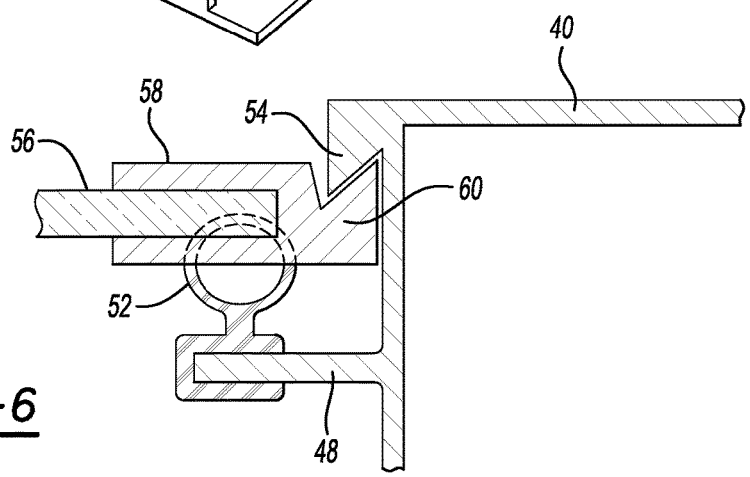
FIG. 6 is a fragmentary, cross-sectional view of window engaging a roof support plate.

Referring to FIG. 6, a window 56 is shown to include a window edge attachment 58. The window edge attachment 58 can be an extruded part that is attached to an upper edge of the window 56. While the window 56, as illustrated, is a glass or transparent plastic panel it should be understood that the window 56 could also be an opaque or solid panel. The window attachment 58 includes an interlock lip 60 that cooperates with the interlock flange 54 of the roof support panel 40. The window 56, or solid panel, may be removed from the roof support by tilting the window upwardly to disengage the interlock lip 60 from the interlock flange 54. The seal 52 is compressed when the glass panel 56 is installed and exerts an upward force on the window edge attachment 58 to hold the interlock lip 60 against the interlock flange 54.

Figure 7:
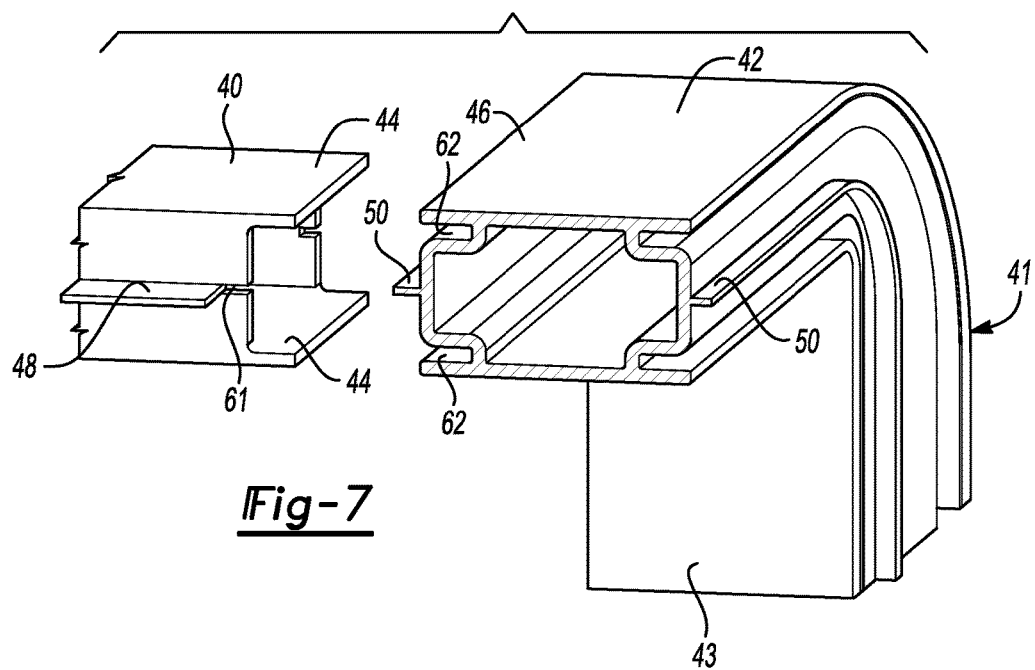
FIG. 7 is a fragmentary, partial cross-section view of a U-shaped bow and roof support plate in position to be assembled.
Figure 8:
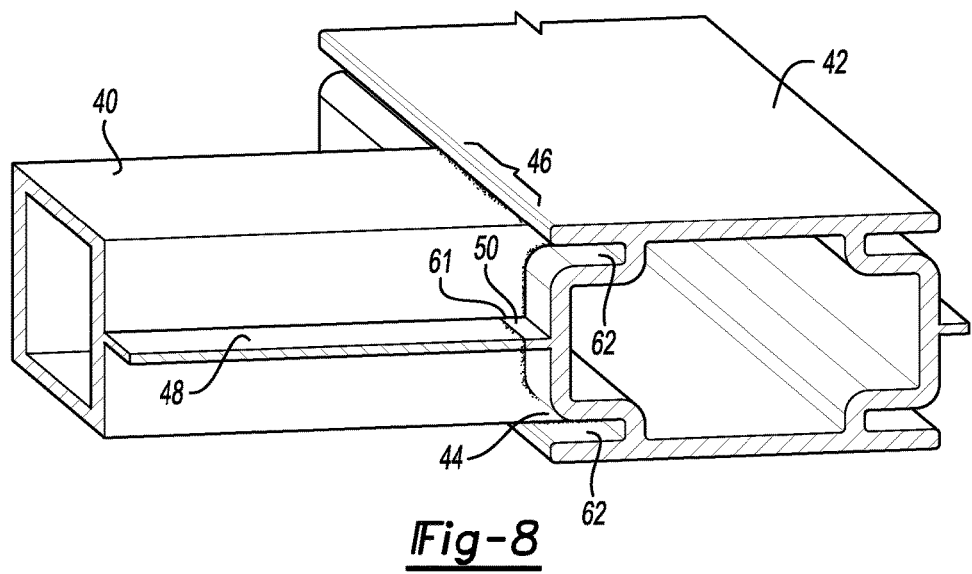
FIG. 8 is a fragmentary, partial cross-section view of the roof support plate welded to a central portion of a U-shaped bow.

Referring to FIGS. 7 and 8, a roof support plate 40 is shown to be aligned with the transverse leg 42. The side window support flange 50 of the U-shaped bow 41 is received in a slot 61 formed in a roof support 40. The support plate 40 is shown welded to transverse leg 42 in FIG. 8 with the side window support flange 50 being received in the slot 61 and the flanges 44 being received in the flange receiving groove 62 defined by transverse leg 42. The support plate 40 is welded to the central portion 46 of the transverse leg 42.

Figure 9:
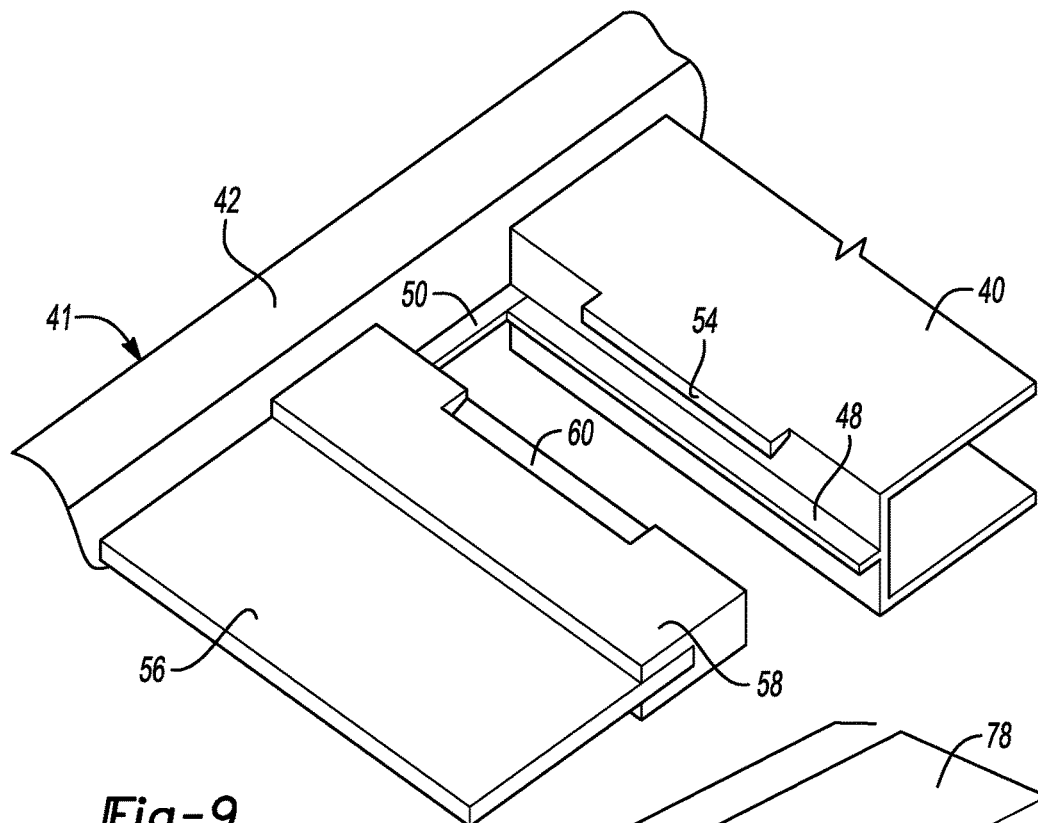
FIG. 9 is a fragmentary, exploded, perspective of a window roof support plate and transverse leg of a U-shaped bow.

Referring to FIG. 9, a window 56, or solid panel, is shown to include a window edge attachment 58 that defines the interlock lip 60. The panel or window 56 is supported on the top window support flange 48 and the side window support flange 50 and is pivoted under the interlock flange 54 to secure the panel or window 56 to the roof support plates 40 and inverted U-shaped bows 41.

Referring to FIGS. 10-15, alternative embodiments of the roof support 12 (shown in FIG. 1) are illustrated that include a curved corner casting instead of the inverted U-shaped bows described with reference to FIGS. 2-9.

Referring to FIGS. 10-13, embodiments disclosed in which roof support plates 70 are secured between adjacent bow assemblies 72. The bow assemblies each include a right side vertical beam 74 and a left side vertical beam 76 that are joined to a transverse beam 78. The right side vertical beam 74 and transverse beam 78 are joined by a right side corner casting 80. The left side vertical beam 76 and transverse beam 78 are joined together by a left side corner casting 82. The transverse beam 78 is received between flanges 84 provided on front and rear sides of the roof support plates 70. A top window support flange 86 is provided on the transverse beam 78 and a side window support flange 88 is provided on the right and left side vertical beam 74 and 76. While not shown, a seal 52 is provided on the window support flanges 86 and 88 that may be similar to seal 52 shown in the embodiment FIGS. 2-9 above.

Figure 11:
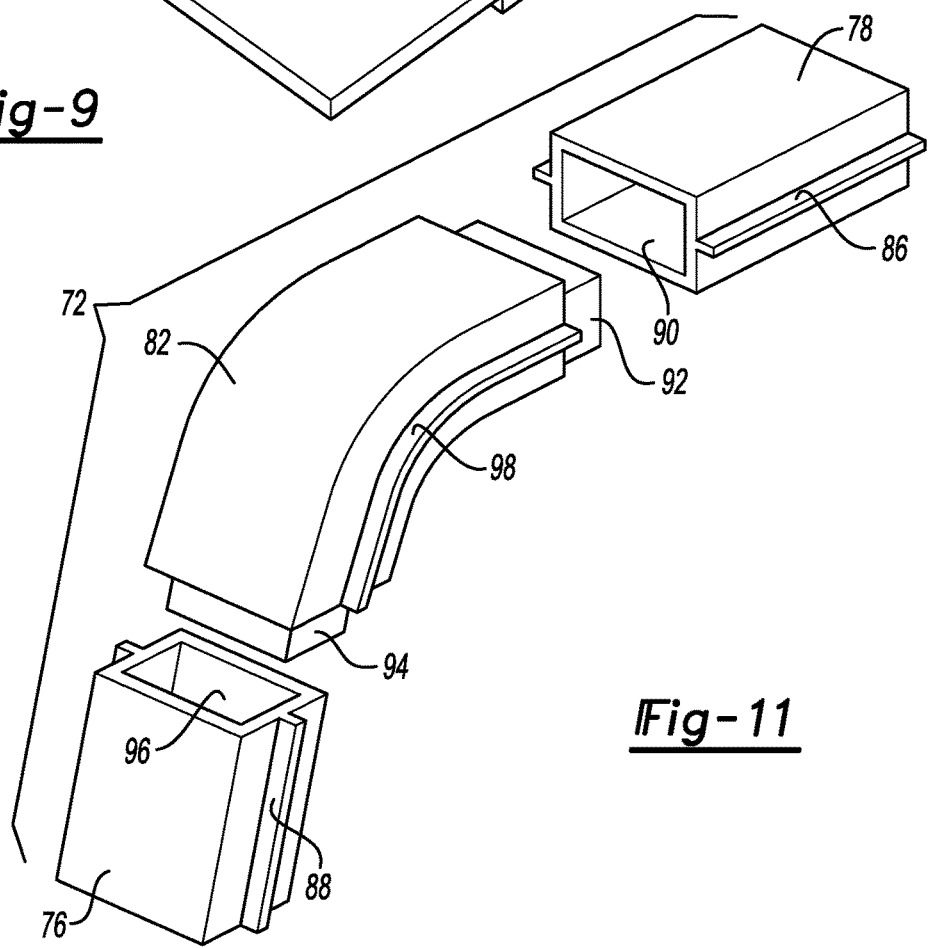
FIG. 11 is an exploded perspective view of a side beam, transverse beam and corner casting in position to be assembled together.
Figure 10:
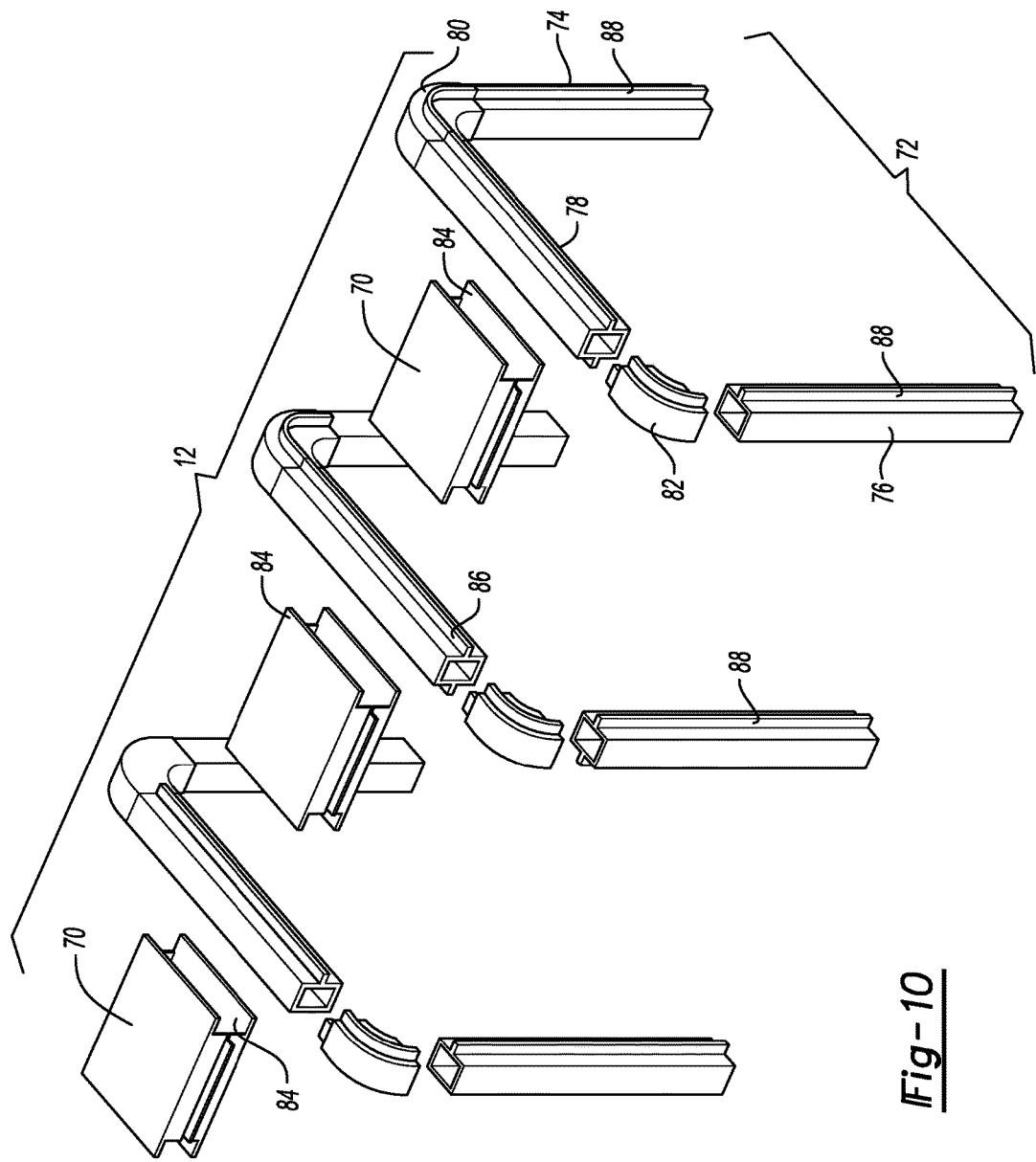
FIG. 10 is an exploded perspective view of an alternative embodiment of a roof support structure including roof support plates and bow assemblies including vertical beams and transverse beam connected by side corner castings.
Figure 12:
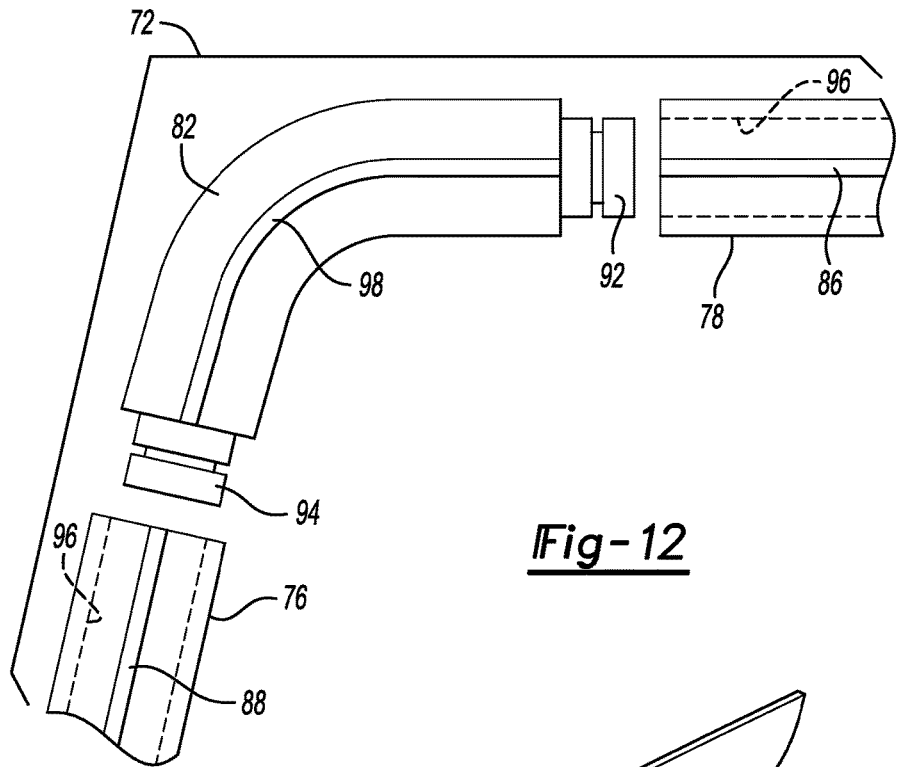
FIG. 12 is an exploded longitudinal elevation view of a vertical beam, a transverse beam and a corner casting.

Referring to FIGS. 11 and 12, a bow assembly 72 is shown with the left side vertical beam 76 and transverse beam 78 separated from the left side corner casting 82. An opening 90 is provided in the transverse beam 78 for receiving a top plug end 92 that extends from the left side corner casting 82. A side plug end 94 is received in an opening 96 defined by the left side vertical beam 76. A corner node window support flange 98 is provided on the side of the left side corner casting 82.

Figure 13:
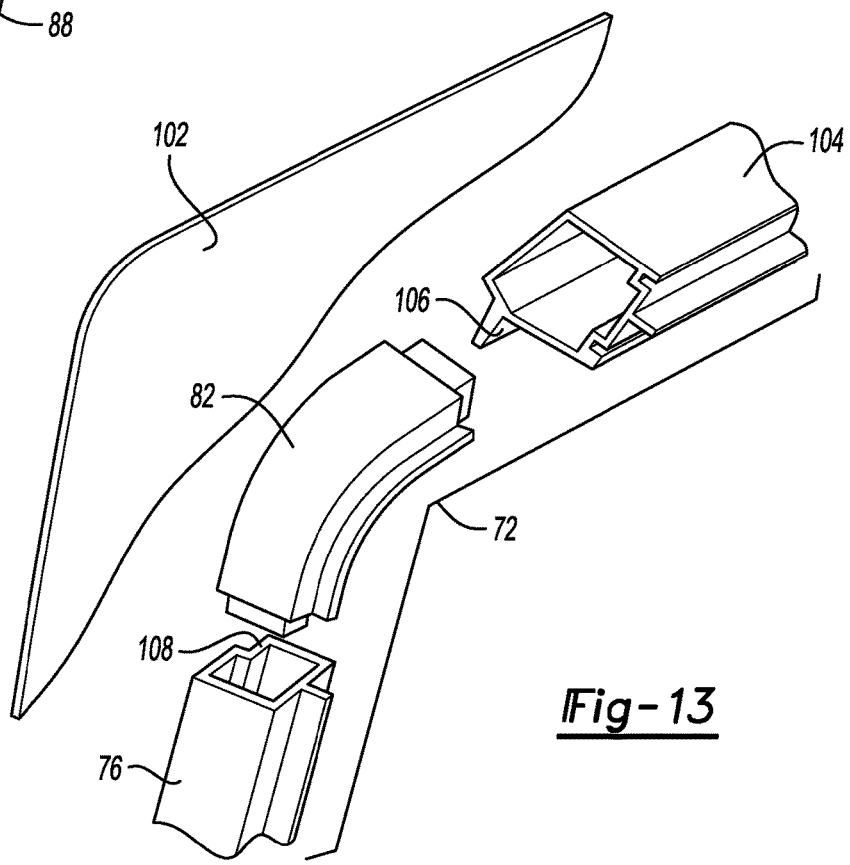
FIG. 13 is an exploded perspective view of a bow assembly and windshield.
Figure 14:
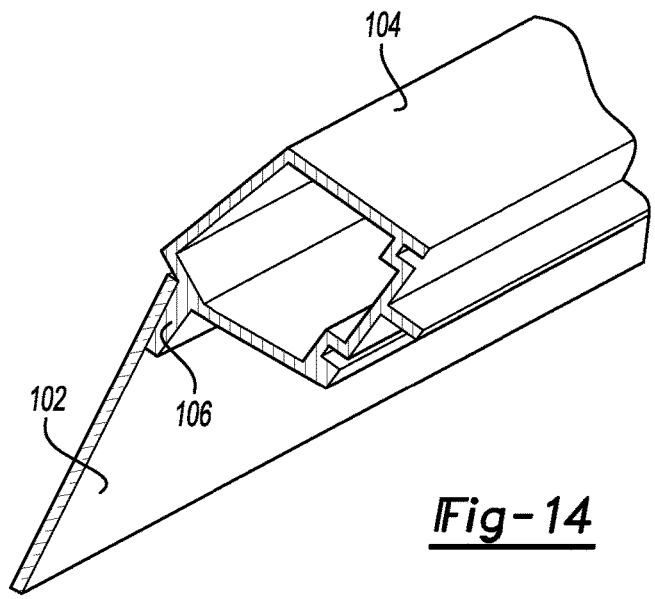
FIG. 14 is a cross-sectional view of a windshield secured to a windshield header.
Figure 15:
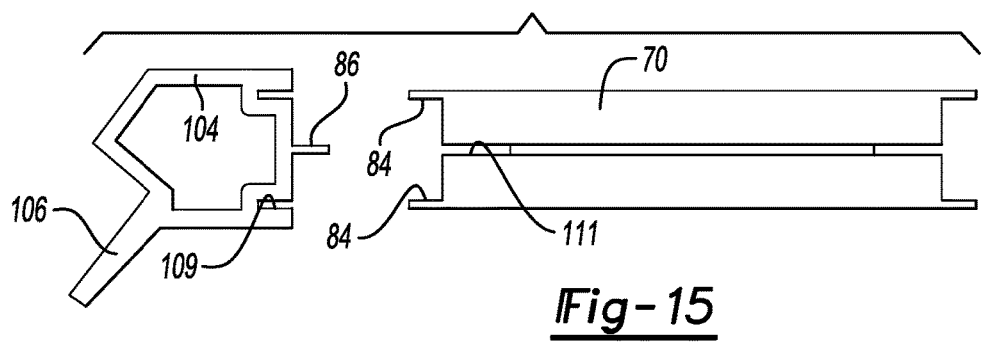
FIG. 15 is an exploded traverse elevation view of a windshield header and roof support plate.

Referring to FIGS. 13-15, a transverse window such as a windshield or rear window is shown as it is intended to be attached to either a front or rear bow assembly 72. The portion of the bow assembly illustrated includes a left side vertical beam 76 that is connected by a left side corner casting 82 to a header 104. The transverse window 102 is secured by an adhesive or seal to a windshield header support flange 106 provided on the header 104, the left side corner casting 82 and also to an A-pillar windshield support surface 108. The A-pillar windshield support surface 108 is recessed to receive the window 102.

Referring to FIG. 15, the header 104 is shown exploded away from the roof support plate 70. The flanges 84 on the roof support plate 70 are received in grooves 109 formed in the rear edge of the windshield header 104. The top window support flange 86 on the header 104 is received in a groove 111 defined by the roof support plate 70.

Figure 16:
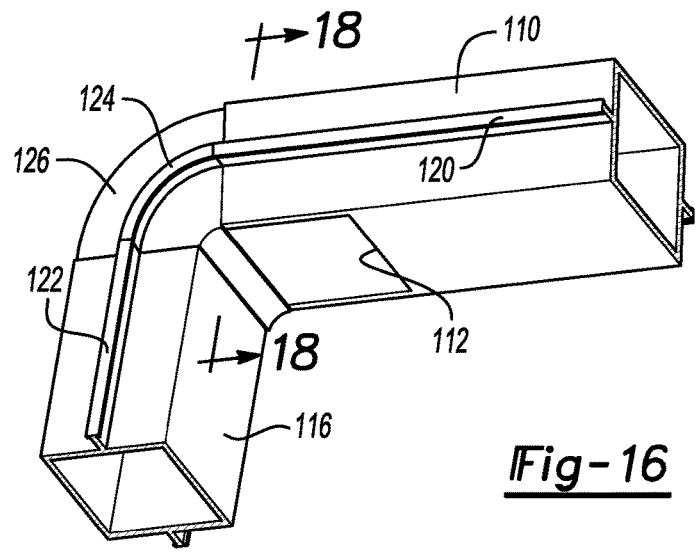
FIG. 16 is a partial cross-section perspective view of a transverse beam including a notch assembled to a curved corner casting and vertical beam.
Figure 17:
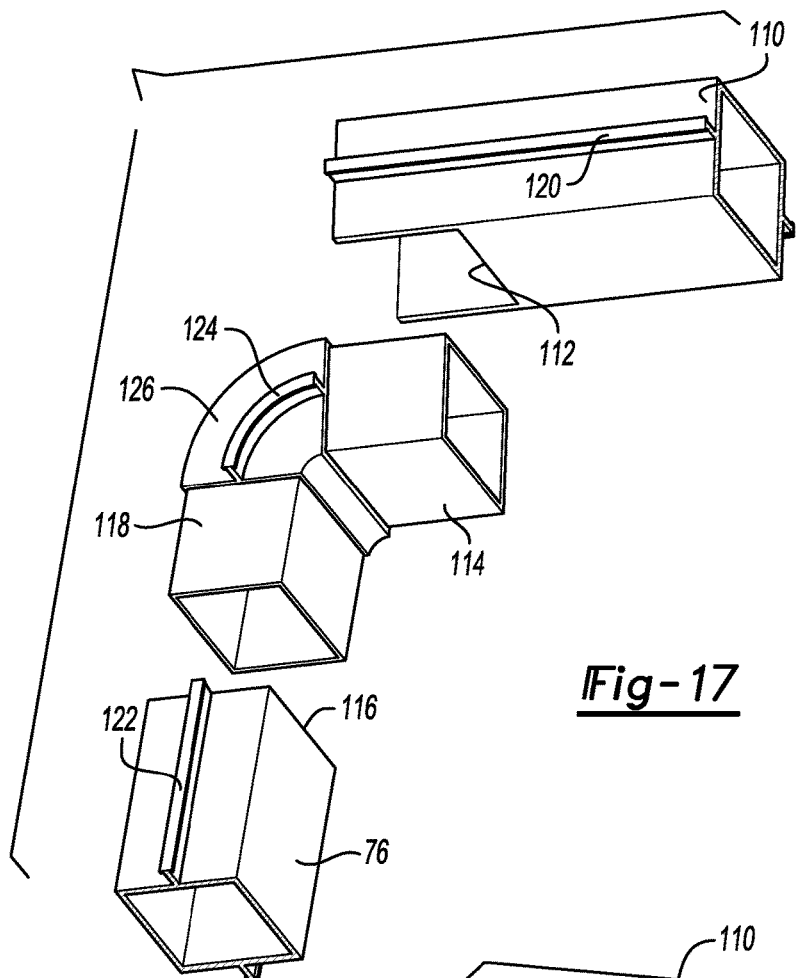
FIG. 17 is an exploded perspective view of the notched transverse beam, curved casting and vertical beam shown in FIG. 16 in an exploded perspective view.
Figure 18:
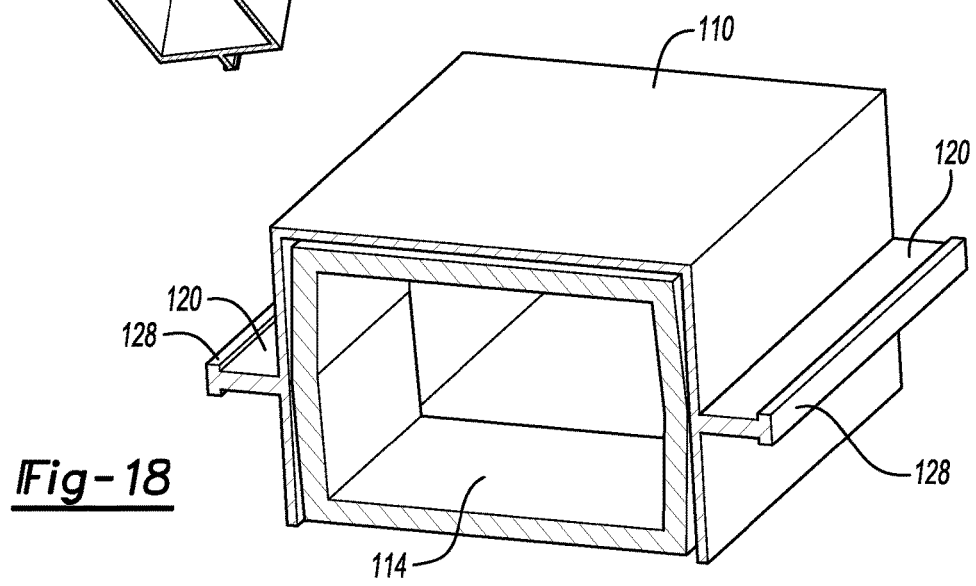
FIG. 18 is a cross-sectional view taken along the line 18-18 in FIG. 16.

Referring to FIGS. 16-18, alternative embodiment of a roof support is illustrated in which a notched transverse beam 110 is assembled over a portion of the curved corner casting 126. The transverse beam 110 defines a notch 112 that is assembled over a plug end 114 of a curved corner casting 126. An opening 116 is defined by the left side vertical beam 76 and receives a side plug end 118 of the curved corner casting 126. A top window support flange 120 is provided on the transverse beam 110 and a side window support flange 122 is provided on the left side vertical beam 76. A corner node window support flange 124 is provided on the side of the curved corner casting 126. The window support flanges 120, 122 and 124 shown in FIGS. 16-17 include a T-shaped edge 128 shown in FIG. 18 that may be provided to facilitate attachment and retention of the seal 52 shown in FIGS. 3, 4 and 6 above. It should be understood that other seal structures may be accommodated to form a seal between the bows 72, support plates 70 and the windows 56, or panels.

Figure 19:
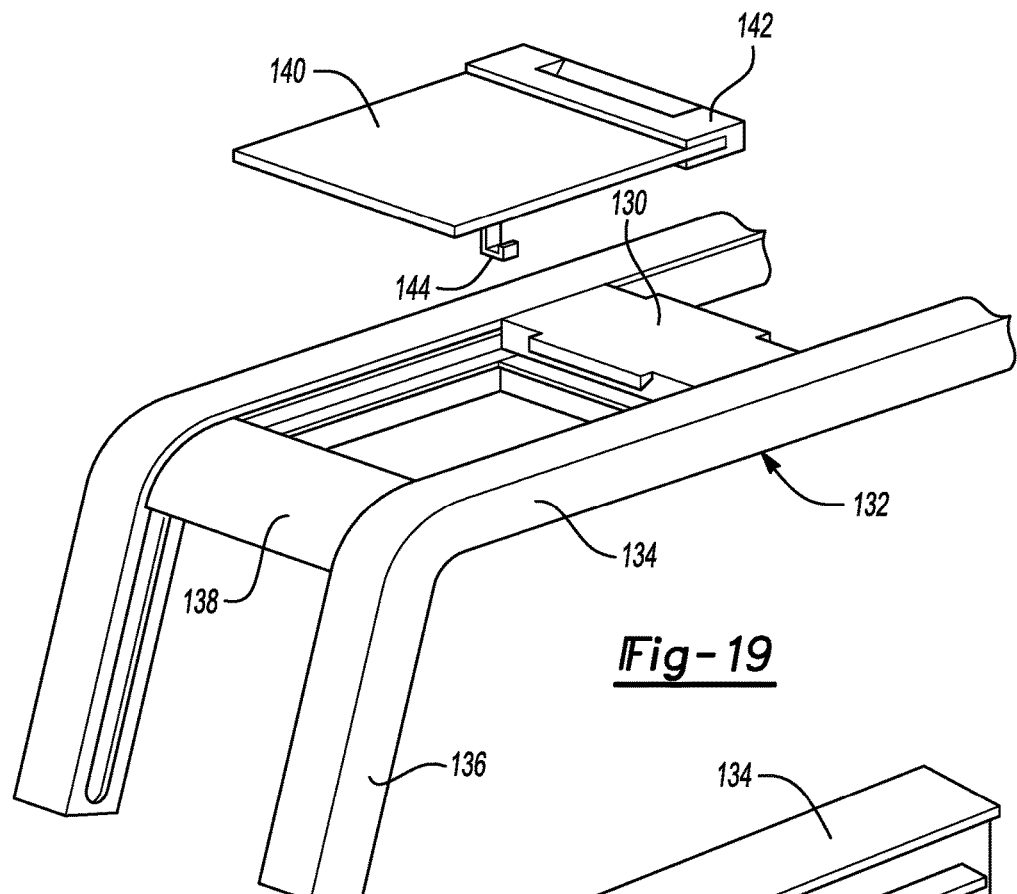
FIG. 19 is a fragmentary perspective view of a roof support structure showing a roof panel exploded away from a roof opening defined by adjacent inverted U-shaped bows connected by a top plate and a curved transition panel.
Figure 20:
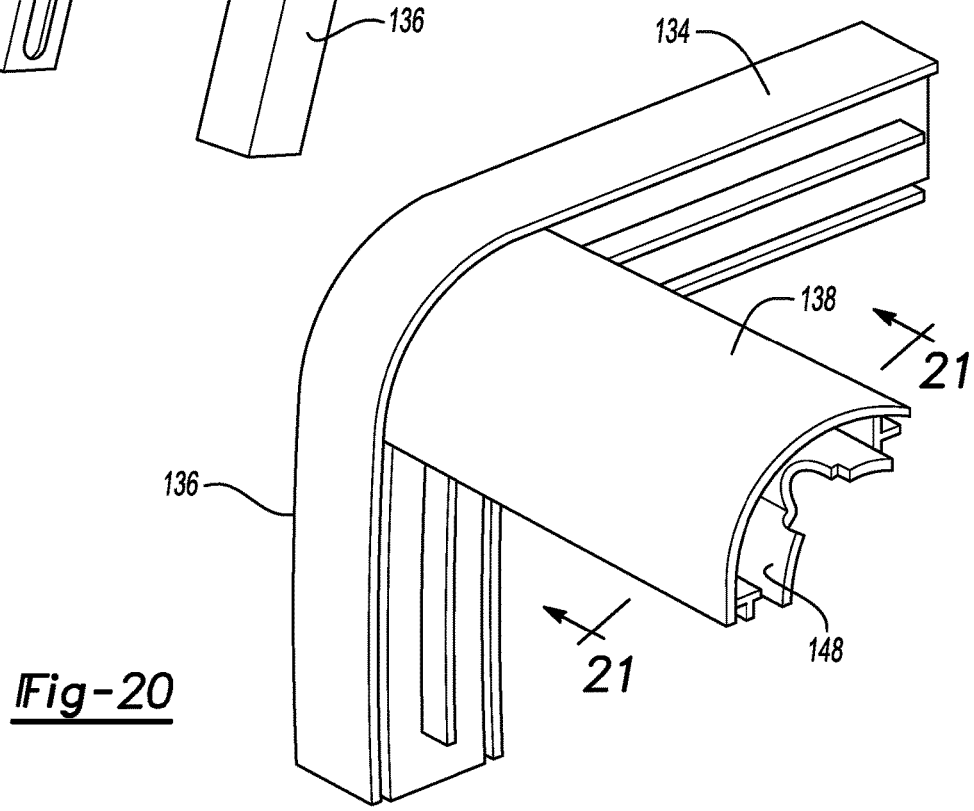
FIG. 20 is a perspective view of one inverted U-shaped bow attached to a curved transition panel.
Figure 21:
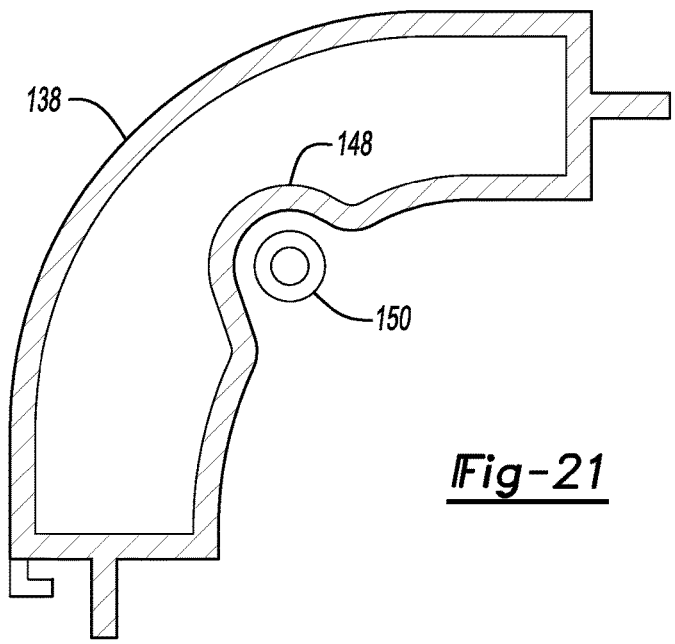
FIG. 21 is a cross-sectional view of a curved transition panel including a side curtain air bag received in a receptacle defined by the curved transition panel.

Referring to FIGS. 19-22, another embodiment is illustrated that includes a corner extrusion extending between adjacent pillars. As shown in FIG. 19, a roof support plate 130 is provided between adjacent pillars or adjacent inverted U-shaped bows 132. The inverted U-shaped bows 132 are similar the embodiment described with reference to FIGS. 2-9 and extends parallel the center line C (shown in FIG. 2) of the roof support. The corner extrusion 138 is illustrated with a separable top roof panel, or window 140. The top roof panel 140 may be a solid panel or a window. The window 14D or panel may include a window edge attachment 142. A latch 144 is also illustrated for securing the panel to one of the U-shaped bows 132. Referring to FIG. 20, the corner extrusion 138 may include side curtain air bag receptacle 148 that is adapted to receive a side curtain air bag 150. Referring to FIG. 21, the corner extrusion 138 is shown in cross-section to include a side curtain air bag receptacle 148 that in turn receives the side curtain air bag 150.

Figure 22:
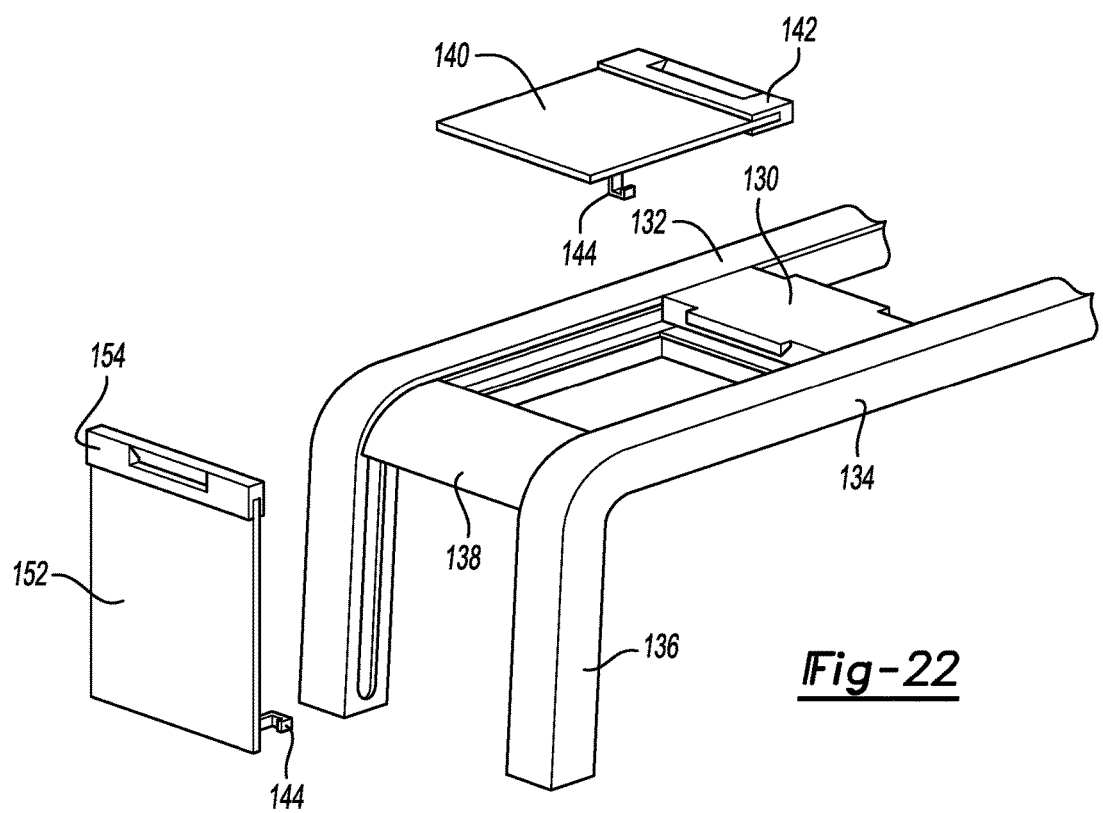
FIG. 22 is an exploded perspective view of the roof support structure shown in FIG. 19 with a side panel and top panel exploded away from openings defined between the adjacent inverted U-shaped bows, the top plate and curved transition panel.

Referring to FIG. 22, the roof support plate 136 is shown disposed between the transverse leg 134 of the adjacent U-shaped bows 132. The corner extrusion 138 is shown at the transition from the transverse leg 134 to the vertical leg 136 of the U-shaped bows 132. A top roof panel or window 140 is shown above the opening defined by the bows 132, roof support plate 130 and corner extrusion 138. The top roof panel 140 is provided with a window edge attachment 142 and latch 144 as previously described. In addition, a side panel 152 that may be a window or a solid panel is shown in position next to an opening defined by the vertical legs 136 of the U-shaped bows 132 and below the corner extrusion 138. The side panel 152 may also include a side window edge attachment 154 and latch 144 to secure the side panel 152 below the corner extrusion.

Figure 23:
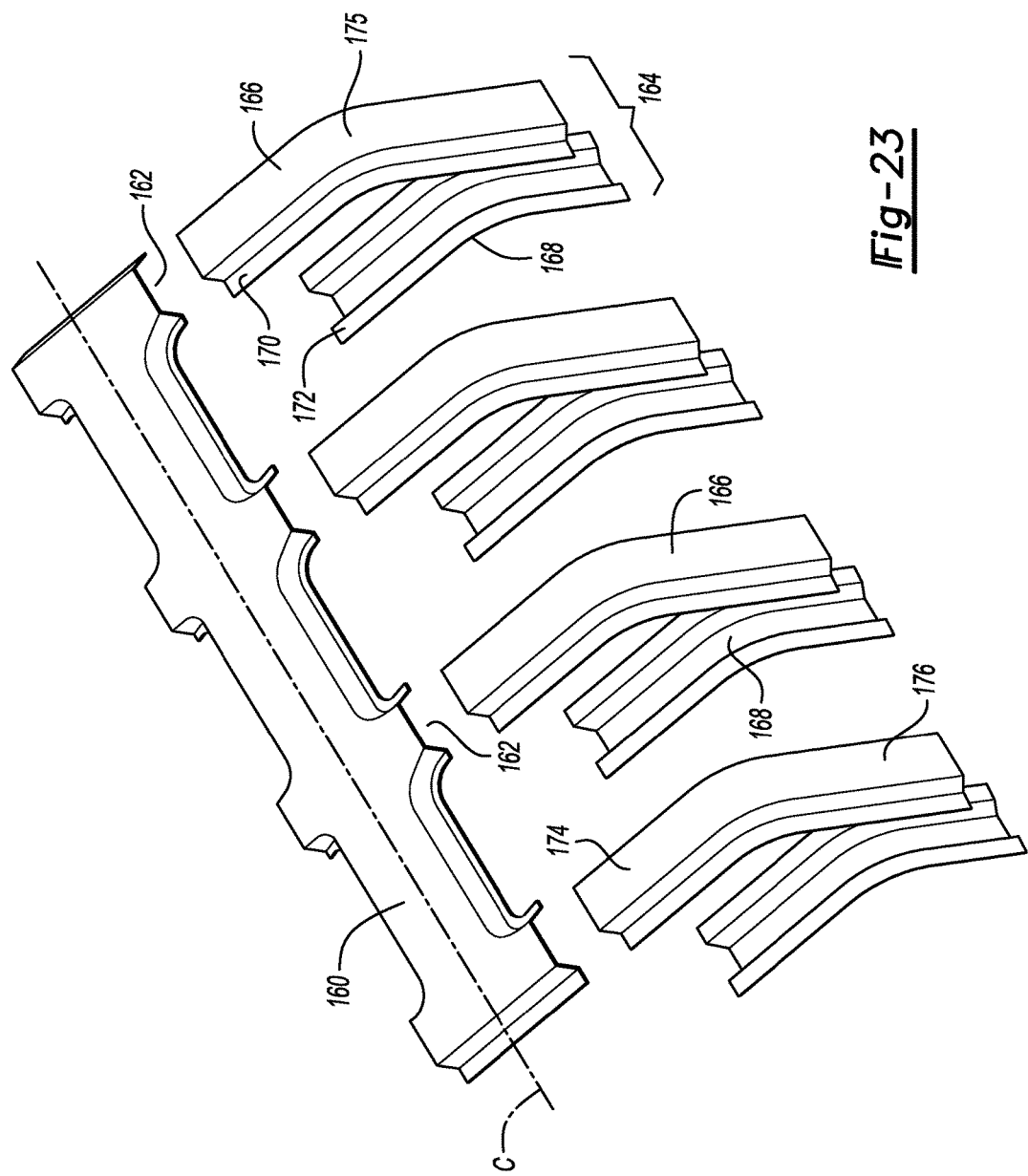
FIG. 23 is an exploded perspective view of a unitary roof support and upper and lower clam shell parts of a plurality of L-shaped pillars.

Referring to FIG. 23, another alternative embodiment is partially shown. It is to be understood that the left side of the roof support is not shown in FIG. 23 but is a mirror image of the structure shown on the right side. A unitary roof support 160 is provided that extends along the center line C of the roof support 160. The unitary roof support 160 defines a plurality of pillar receptacles 162. The unitary roof support 160 is preferably formed in a sheet metal stamping process and may be stamped from metal such as aluminum or steel. The roof support 160 also includes a plurality of L-shaped pillars 164 that may be designated A-pillars through D-pillar as previously described. The L-shaped pillars 164 include an upper clam shell part 166 and a lower clam shell part 168. The clam shell parts 166 and 168 are joined together to form the L-shaped pillars 164. Additional reinforcements or pillars may be provided inside the clam shell part. The upper clam shell part 166 includes upper joining flanges 170 and a lower clam shell part 168 includes lower joining flanges 172. The upper and lower joining flanges 170 and 172 may be joined together by welds, adhesive deposits or fasteners to form a rigid support structure for the unitary roof support 160. The L-shaped pillars 164 include a transverse leg 174 that extends from the roof support 160 to a curved area 175 where the side leg 176 extends downwardly to the beltline B (shown in FIG. 1). Windows 56 or other panels may be assembled between adjacent L-shaped pillars 164 as described with reference any of the embodiments of FIGS. 2-22. Seals 52 are intended to be provided on support flanges. Latches and interlocking flanges are also intended to be incorporated in the embodiment of FIG. 23 as previously described with reference to the embodiments of FIGS. 2-22.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A vehicle comprising:
a body defining a compartment having a beltline;
a plurality of inverted U-shaped pillars connected at the beltline to opposite lateral sides of the compartment and extending over the compartment;
a plurality of plates each connecting adjacent pillars at a central location;
a plurality of windows having a side portion and a roof portion connected by a curved portion, each window is assembled to one plate and two adjacent pillars;
a plurality of side flanges extending in a fore-and-aft direction from the U-shaped pillars, wherein a central portion of the side flanges is received by the plates to connect the U-shaped pillars to the plates; and
a top flange extending laterally from the plates, wherein the windows are supported by the side flanges of adjacent U-shaped pillars and the top flange.

2. The vehicle of claim 1 wherein the U-shaped pillars are aluminum extrusions.

3. The vehicle of claim 2 wherein the U-shaped pillars are continuous one-piece extrusions.

4. The vehicle of claim 2 wherein the U-shaped pillars further comprise two side extrusions and a roof extrusion that are connected by a curved corner casting.

5. The vehicle of claim 1; further comprising:
a seal attached between each of the windows and each of the side flanges and the top flanges.

6. The vehicle of claim 1 further comprising:
a windshield;
a support flange provided on a forward most one of the U-shaped pillars; and
a windshield seal, wherein the windshield is assembled to the seal and the support flange of the forward most one of the U-shaped pillars.

7. The vehicle of claim 1 further comprising:
a first lip provided on the roof portion of the windows;
a second lip provided on the plates that is engaged by the first lip in an installed position and is disengaged by the first lip by pivoting the window upwardly; and
a latch provided at a spaced location from the first lip that retains the window in the installed position.

8. A vehicle comprising:
a body defining a compartment having a beltline;
a plurality of inverted U-shaped pillars connected at the beltline to opposite lateral sides of the compartment and extending over the compartment;
a plurality of plates each connecting adjacent pillars at a central location; and
a plurality of window assemblies having a side portion and a roof portion connected by a curved portion, each window assembly is assembled to one plate and two adjacent pillars, a plurality of aluminum extrusions that define a pocket for receiving a side curtain air bag and form the curved portions, wherein the side portions of the windows and the roof portions of the window are separate.

9. A vehicle comprising:
a body defining a compartment having a beltline;
a longitudinal roof support defining a plurality of spaced receptacles;
a plurality of inverted L-shaped pillars connected at the beltline to a lateral side of the compartment that extending over the compartment and received by the receptacles; and
a plurality of windows each having a side portion and a roof portion, wherein each window is assembled to the roof support and two adjacent pillars.

10. The vehicle of claim 9 wherein the L-shaped pillars are stamped clamshell assemblies.

11. The vehicle of claim 10 wherein the longitudinal roof support is a stamped sheet metal part.

12. The vehicle of claim 9 further comprising:
a side flange extending in a fore-and-aft direction from the L-shaped pillars; and
a top flange extending laterally from the roof support, wherein the windows are supported by the side flange of the L-shaped pillars and the top flange.

13. The vehicle of claim 12 further comprising:
a seal attached between each of the windows and each of the side flanges and the top flanges.

14. The vehicle of claim 9 further comprising:
a windshield;
a support flange provided on a forward most one of the L-shaped pillars; and
a windshield seal, wherein the windshield is assembled to the windshield seal and the support flange of the forward most L-shaped pillar.

15. The vehicle of claim 9 further comprising:
a first lip provided on a window edge flange attachment to the roof portion of the windows;
a second lip provided on the roof support that is engaged by the first lip in an installed position and is disengaged by the first lip by pivoting the window upwardly; and a latch provided at a spaced location from the second lip that retains the window in the installed position.

16. The vehicle of claim 9 wherein the window is a window assembly that further comprises:
a plurality of aluminum extrusions each defining a pocket for receiving a side curtain air bag, and wherein the side portions of the windows and the roof portions of the windows are separate transparent panels.

* * * * *